June 9, 1964          J. MAGSON          3,136,208
OPTICAL SPACE MONITORING APPARATUS
Filed May 27, 1959          6 Sheets—Sheet 1
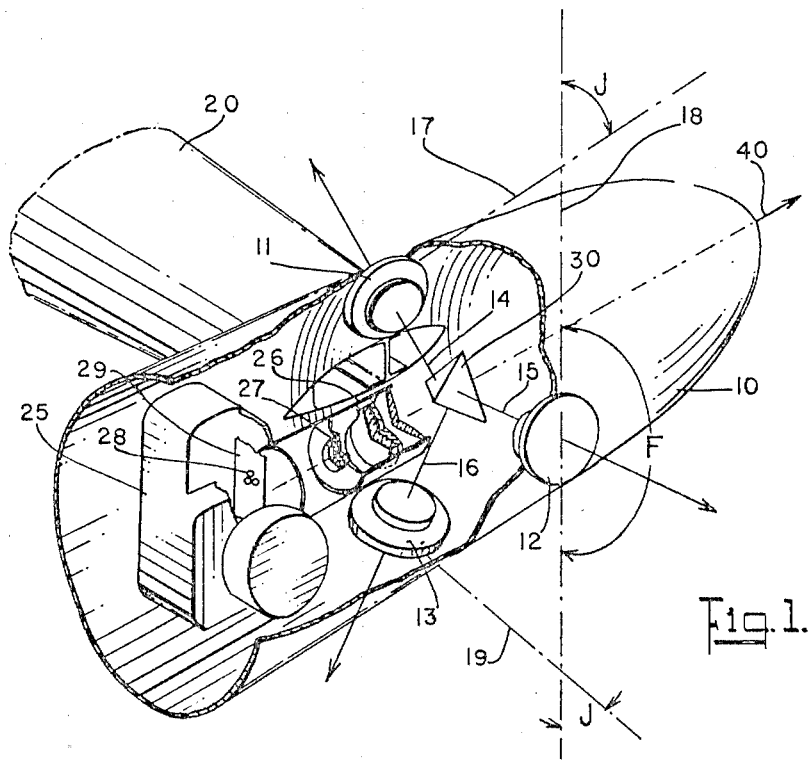
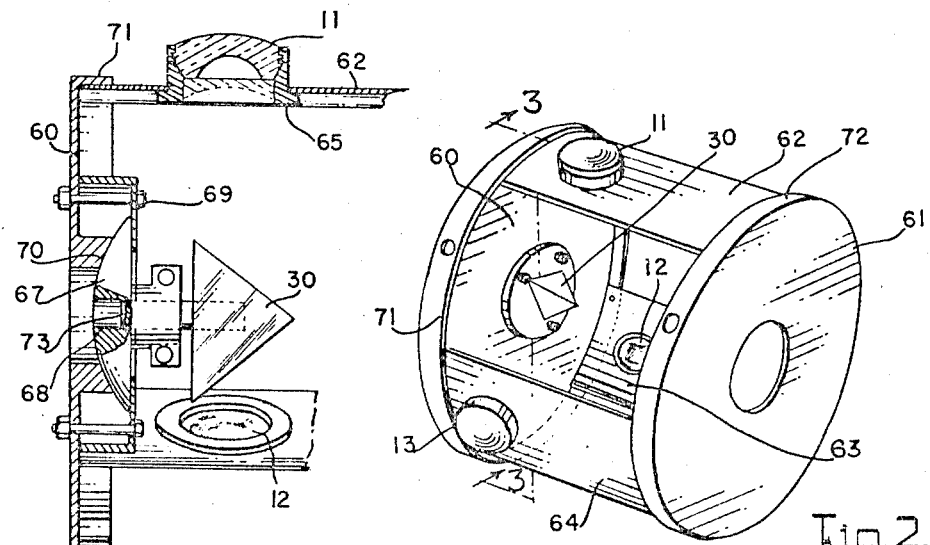
INVENTOR
JOHN MAGSON
by R. J. Filipkowski AGENT

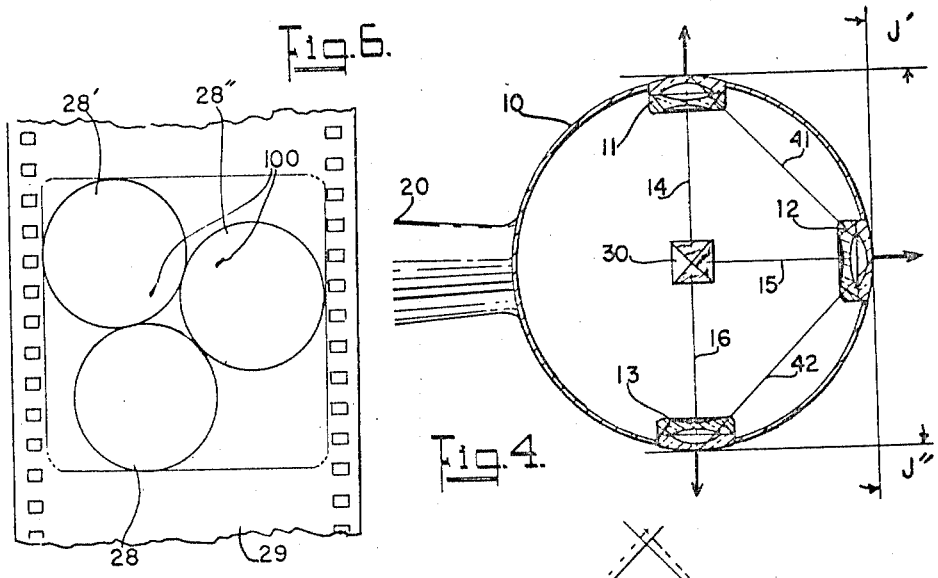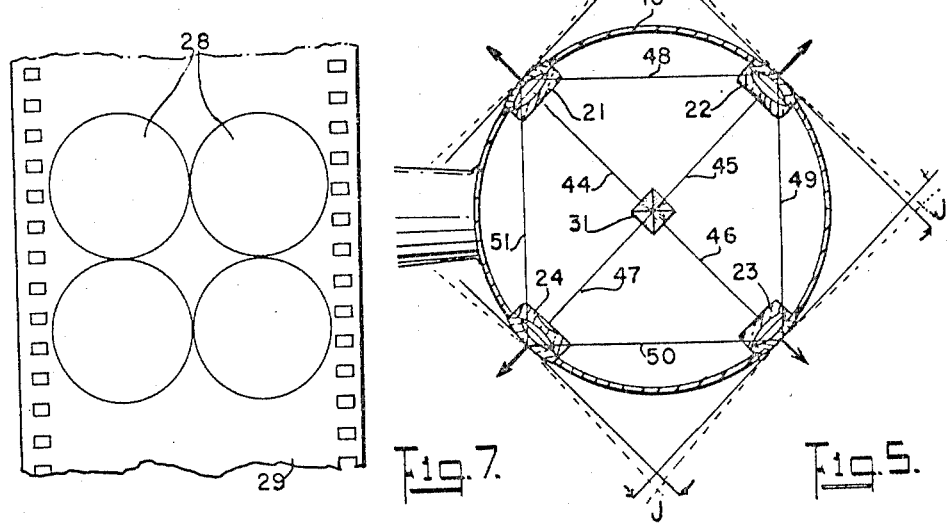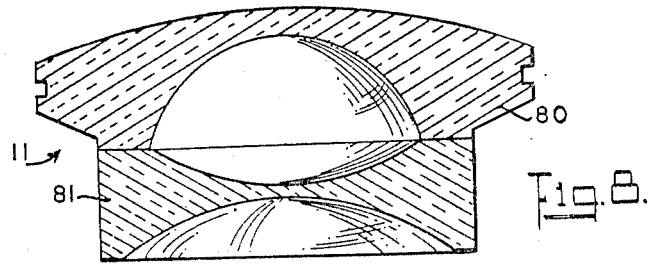

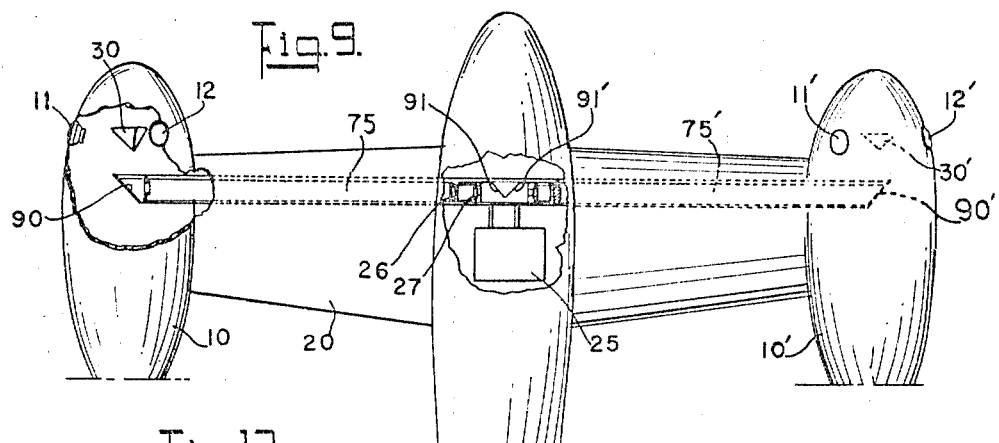
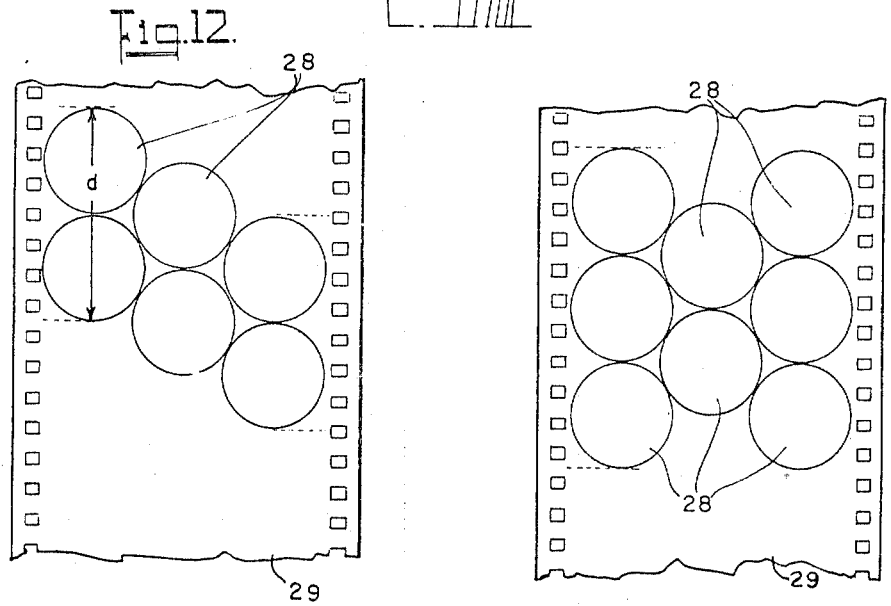
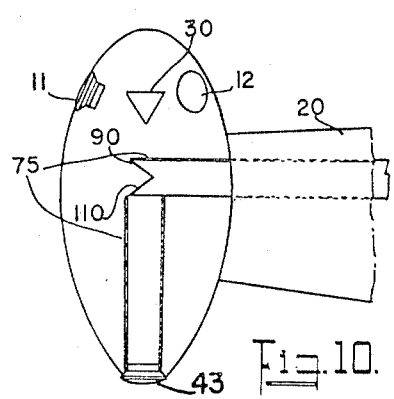

INVENTOR
JOHN MAGSON
by R. J. Filipkowski
AGENT

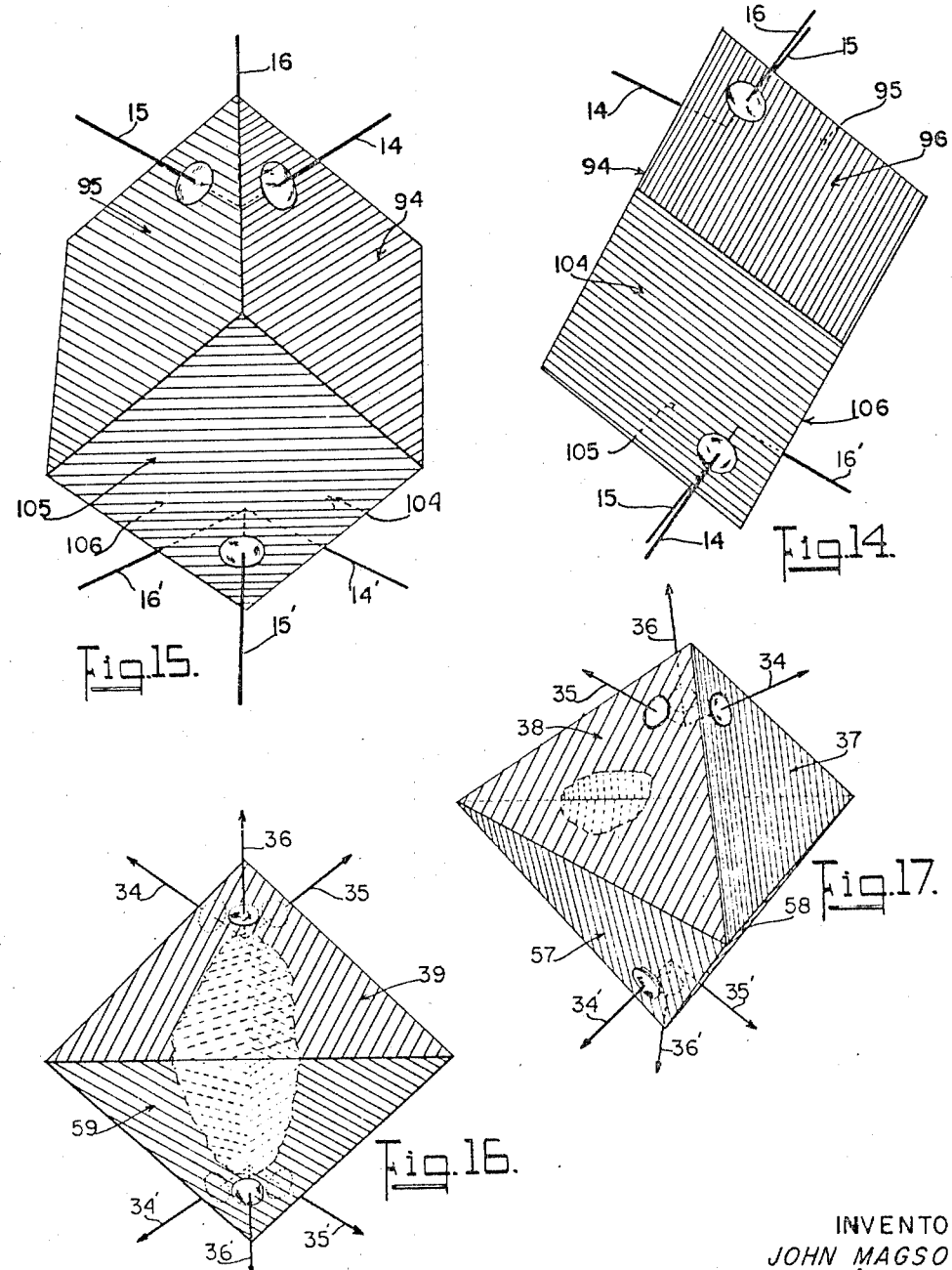

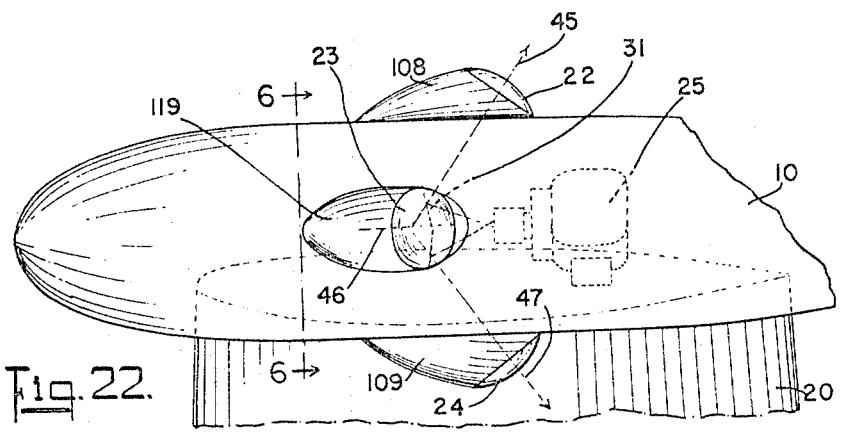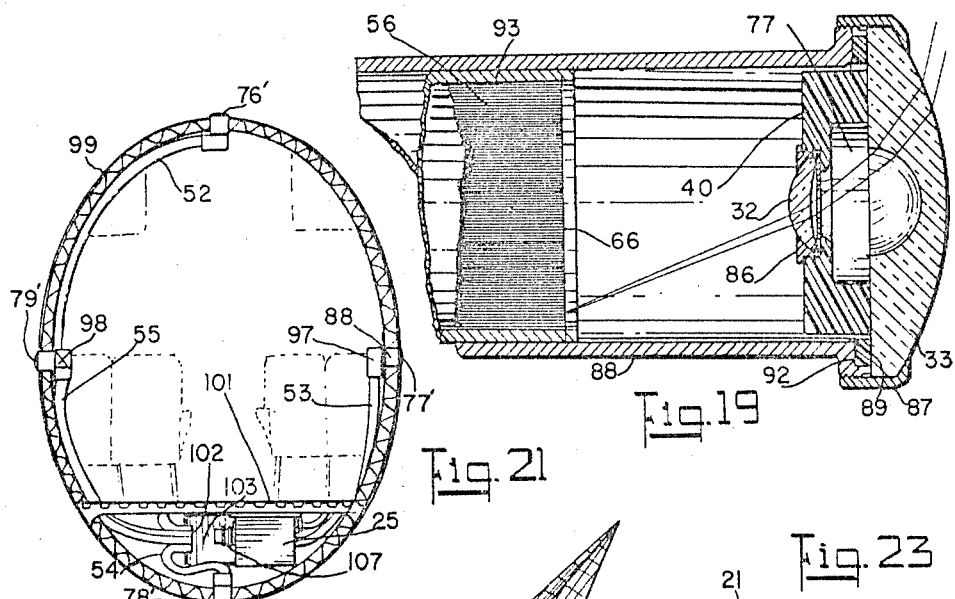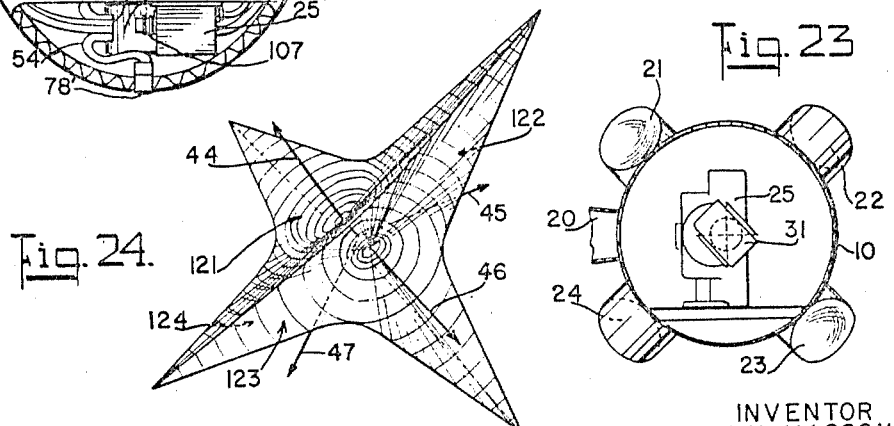

3,136,208
OPTICAL SPACE MONITORING APPARATUS
John Magson, Ottawa, Ontario, Canada, assignor, by mesne assignments, to Her Majesty the Queen in right of Canada as represented by the Minister of National Defense, Ottawa, Ontario, Canada
Filed May 27, 1959, Ser. No. 816,133
6 Claims. (Cl. 88—16.6)

The invention herein described is concerned with optical recording systems, and in particular is directed to improvements in image recording systems for simultaneously recording a plurality of images obtained with systems comprising a plurality of spaced lenses.

In the observation of an object moving with respect to an observation station, it is known to determine the instantaneous position of the object with respect to the station by simultaneously observing angles made with the object from the ends of one or more base lines by a plurality of optical devices, for example kine-theodolites, or cameras. The computation of points on the trajectory of an object with respect to a datum is carried out by translating data from sets of images recorded at known time intervals to yield respective angles between the ends of a base line or lines and sets of direction lines drawn therefrom to the object.

Heretofore, the accurate determination of the path of movement of an object at predetermined times with respect to an observation station or stations has been difficult and costly, where the spatial zone within which the object trajectory is to be determined is not limited to a relatively narrow solid angle. In the plotting of the flight path of a vehicle with respect to an airborne observation station or trajectories of a missile, it is necessary to monitor a spherical volume, requiring omnidirectional optical data collector systems.

Prior art optical recording systems for this purpose have been embodied as a large plurality of lenses and individual camera systems or a battery of kinetheodolites in order to obtain a sufficient number of adequately large recorded images for the purpose of accurate data reduction. Embodiments of such systems suffer disadvantages of very high cost and weight, particularly where high speed motion picture photography methods must be employed in collecting a sequence of data to plot a missile trajectory with respect to a high speed observation vehicle.

By the practice of the present invention apparatus is provided comprised of at least one pair of spaced optical collector systems having their principal optical axes arranged so that the fields of view of the collectors overlap to a substantial degree and whereby a plurality of simultaneous images are assembled from such systems upon a common image record medium. By the use of wide angle lenses having suitably high resolution over their fields of view, and the employment of a single image transducer, such as a camera, the image data collected by such recording system for an object viewed simultaneously by a pair or pairs of said spaced lenses makes possible the determination from a single record with improved accuracy the position of the object with respect to the system.

In greater particular, a preferred arrangement comprises two or more wide angle lenses spaced apart in fixed positions having their optical axes angularly related although not necessarily lying in a common plane, and each having a field of view subtending substantially twice the angle formed between the principal axes of adjacent lenses. Respective images of such array of lenses are assembled by optical elements and recorded simultaneously as a set on a single frame of a motion picture camera or the like. The recorded data is useful for the determination therefrom throughout a peripheral zone in space of the distances and directions to an object from the observing lenses of the system. For example, a belt system of spaced wide angle lenses, having their optical axes fixed and angularly divergent by angles which are substantially half the angle subtended by their fields of view and a common image recording apparatus, permits distance and direction determinations of an object located within a predetermined range to be made throughout overlapping zones girdling the observation station. A sufficient number of lenses may in general be provided so that their overlapping fields provide for substantially complete coverage through one or more than one belt zone each containing the optical axes of a group of observing lenses, whereby the distance, direction, and velocity to an object in any position relative to the system may directly be determined from analysis of the assembled images.

Since the accuracy of determination of distance of an object from the observing station improves as the ratio of the inter-lens distance of a viewing pair increases with respect to object distance, the several inter-lens baselines provided by spaced lenses preferably are made as large as possible. Accordingly, for various vehicle configurations, the several lenses and their optical systems are caused to be suitably disposed in fixed relation spaced apart as far from each other as may be feasible, so that data may be derived from images chosen from pairs of lenses spaced by suitable distances. The number of lenses required for substantially spherical coverage may be reduced considerably when their useful fields of view subtend angles approaching hemispheric. For example, substantially complete spherical coverage may be obtained with a system of six lenses each having 180° fields of view arranged as two spaced apart groups of three, among which no two principal lens axes are parallel. Despite the multiplication of image collector elements, the present invention permits substantial advantages and economies of apparatus to be realized in that only a single camera or recording apparatus need be employed for obtaining simultaneously assembled images from each separate lens in a predetermined pattern, on a single plate or record, the camera preferably being located between such spaced apart groups of lenses.

Essentially, therefore, the invention consists in the provision of a plurality of lenses supported in a carrier having their optical axes diverging outwardly with predetermined angular spacing, the number of lenses and the angular span of their fields of view being related so that there is a significant degree of overlap of adjacent fields of view in combination with optical elements for assembling the optical rays collected by individual lenses upon a common image plane, and means to record such assembled image group. The invention moreover extends to the provision of groups of lenses spaced apart by a distance greater than the spacing between the centers of adjacent lenses of a group, with the assembly of images for each group being arranged to be recorded upon a single common image recording device.

In carrying the invention into effect, an optical data collector system employing a plurality of spaced wide angle lenses may be realized by mounting a number of wide angle lenses having fields of view greater than 120°, about the periphery of a support frame, so that the lenses are themselves physically separated by fixed distances and their optical axes are angularly spaced so that their respective fields of view overlap to a substantial degree, and by arranging suitable optical elements for collecting optical rays from each lens and for focusing a group of images upon a common record medium in a camera or the like.

According to one embodiment, such optical elements comprise a series of mirrors or prisms and the like, for directing the ray bundles of each lens to converge upon a common imaging system, such as a camera objective. The nature of the camera is immaterial, provided that it is effective to produce and simultaneously record an assembled group of images upon a single record medium as a visible record or display suitable for analysis and data reduction. The nature of such record is moreover not critical, provided that it be susceptible of analysis either simultaneously with or at some time after the production of the images. Accordingly, photographic film cameras, television cameras or infra-red imaging systems may be employed, with suitable image handling devices capable of retaining the simultaneously observed set or sets of individual images.

Image handling optical elements for directing ray bundles to a common imaging system may comprise any arrangement of image conversion and transmission systems known in the art capable of simultaneously registering real images of useful intensity produced by each observation lens on a remote single record medium. To this end the invention contemplates the provision of remote viewing and recording systems of either electrical or mechanical nature for bringing the image data collected by viewing lenses together upon a common record medium.

The invention is particularly described in association with certain fixed optical elements for producing an image of useful intensity upon a record medium located at a very great distance from a viewing lens, which may be, for example, a negative collector lens. Applicant has devised novel and effective imaging systems for producing composite images satisfactory for cinematographic recording; wherein each collector lens may be spaced several yards from an adjacent lens.

The practice of the invention may be the better understood by a careful reading of the following description in conjunction with the accompanying figures of drawing, wherein:

FIG. 1 is a perspective view partly cut away of an airborne vehicle wing pod structure carrying a group of spaced lenses having angularly related axes and a camera for producing a composite image group;

FIG. 2 is a perspective view of optical element support structure of the optical system of FIG. 1;

FIG. 3 is a detail section on the line 3—3 of FIG. 2 showing a mirror adjustment and lens mounting structure;

FIG. 4 is a transverse cross-section through a group of lenses similar to that of FIG. 1, showing three lenses unequally spaced to provide hemispheric coverage on one side of a longitudinal vertical plane;

FIG. 5 is a transverse cross-section through a group of lenses similar to that of FIG. 1, wherein four equally spaced lenses are mounted in a wing pod;

FIGS. 6 and 7 are respectively plan views of assembled images obtained with the embodiments of FIGS. 4 and 5;

FIG. 8 is a cross-section on a diametral axial plane showing a type of collector lens employed;

FIG. 9 is a plan view of an aircraft vehicle having two spaced groups of collector lenses mounted in wing pods and optically coupled by a periscope with a pair of objectives and a single recording camera;

FIG. 10 shows an alternative embodiment similar to FIG. 9 including additional lenses facing aft in each wing pod;

FIG. 12 is a plan view of a film strip showing the assembly of images of the embodiment of FIG. 9;

FIG. 13 is a plan view of film strip showing an assemblage of images fom the embodiment of FIG. 10;

FIG. 14 illustrates an arrangement comprising six lenses having hemispheric fields of view, all principal lens axes being non-parallel;

FIG. 15 is another view showing the coverage of the assembly of FIG. 14;

FIGS. 16 and 17 are further perspective views showing an assembly similar to that of FIG. 14, except that the lenses of the two groups are oriented with mirror symmetry about a longitudinal medial vertical plane;

FIG. 19 shows in detail a diametral axial cross-section of the imaging system of FIG. 18;

FIG. 21 shows a section taken along the line B—B of FIG. 20;

FIG. 22 illustrates an optical system comprising four lenses having their optical axes lying in respective orthogonally intersecting longitudinal planes, no two axes being parallel;

FIG. 23 is a front elevation view of the system of FIG. 22; and,

FIG. 24 is a left-frontal perspective view of optical coverage of the group of lenses of FIG. 22.

Figure 18:
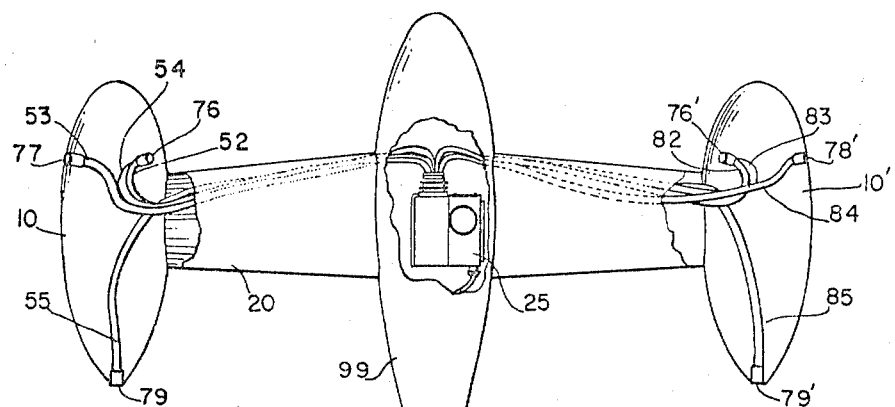
FIG. 18 shows a plan view of an alternative assembly similar to that of FIG. 10, wherein glass fiber bundle optical image carriers are associated with positive image-forming collector lenses.

Referring to FIG. 1 of the drawing, an optical space monitoring system comprises three collector lenses 11, 12, and 13, supported in a suitably faired wing pod or fuselage empennage 10, affixed for example on the tip of a wing 20. The principal axis of each lens, respectively numbered 14, 15, and 16, is directed generally perpendicular to a flight direction axis 40 and intersects a mirror body 30 having three mirror faces respectively inclined with respect to the principal axis of a lens. The face of each mirror is so inclined as to direct the rays toward an objective 26 of a camera device 25. The angular spacings between the lens axes 14, 15, and 16 are shown to be equal and 120 degrees in magnitude; however other angular spacings may be employed as will be more particularly described hereinafter. Each of the lenses, which comprise a multiple element negative collector lens to be described in detail hereinafter, forms a virtual image forward of its front element, and has a wide field of view denoted by the angle F. Throughout the present specification the term "wide angle" is applied to either positive or negative lenses which are useful for recording images of objects whose direct rays subtend angles of at least 45 degrees with the principal axis of the lens. In illustration of the angular extent of each lens' field of view, lines 17, 18 and 19 are shown lying in a common plane normal to the flight direction axis 40. These lines represent the margin of the conical field of view coaxial with the principal axis of each lens as delineated by its intersection with the aforesaid plane.

The fields of view of adjacent lenses overlap as indicated by the angle J formed between extensions of the pairs of lines 17—18, 18—19, and 19—17. Referring to FIG. 4, the spatial coverage of an assembly of three lenses 11, 12 and 13 is diagrammatically represented in elevation, viewed along the flight direction of FIG. 1. In this embodiment, the inter-lens distances 41 and 42 are equal, representing the distances between lenses 12 and 11, and between lenses 12 and 13, respectively. The spacing between lenses 13 and 11 is greater, and the principal axes of the latter two lenses are aligned. This embodiment provides an improved coverage of that hemisphere in space lying in the right of a vertical longitudinal plane including the flight direction axis 40.

That sector centered on the mirror 30 throughout which common viewing is provided by the pair of lenses 11, 12, is indicated by the angle J', while that sector denoted J" represents a spatial region viewed in common by lens pair 12 and 13. A narrow sector centered along the principal axis of lens 12 has a single lens view thereof when J' and J" are slightly less than 90 degrees. The sectors J' and J" may however be made contiguous, as by choosing collector lenses each having a field of view subtending an angle greater than 180 degrees, or by slightly reducing the lengths of the baselines 41 and 42 so as to decrease the angle between the axes 14 and 15, and between 15 and 16. Each of the mirror faces of the composite mirror 30 is so adjusted with respect to the principal axis of each lens and the axis of the objective 26, 27 of camera 25, as to register the images within a single frame area of film strip 29. The images are preferably not superimposed, but they may be arranged to overlap where common viewing is impossible as due to obstruction by the frame of the carrier.

Referring additionally to FIG. 6, a plurality of images 28 correlated with the number of lenses employed is shown. The image 100 of an object lying forwardly and upwardly to the right of the craft is shown in the images of lens 11 and lens 12 in whose fields of view the object lies. The aforesaid images are labelled respectively 28′ and 28″.

Since each lens is fixed with respect to the aircraft frame, the spatial position of the object 100 may be computed by deriving the angels made by the object with the axis of each lens by which it is imaged through the use of suitable overlay grids, and computing the co-ordinates of the object with respect to the co-ordinates of the aircraft frame, or other reference system.

In the embodiment of FIG. 5, there is illustrated an arrangement of lenses wherein a belt zone girdling the support 10 is substantially completely monitored. The zone includes the plane in which the axes 44, 45, 46 and 47 of respective collector lenses 21, 22, 23 and 24 lie. The lenses are equally separated, and are disposed at the ends of four baselines 48, 49, 50 and 51. The system provides four sectors throughout which effective viewing in common by respective pairs of adjacent lenses is possible. When the collector lenses have effective fields of view slightly in excess of 180 degrees, the sectors may be contiguous so that the belt zone is monitored without gaps. Lenses having angular fields of view less than 180 degrees may also be employed, where the overlap need not be continuous. Each lens' field then resembles a shallow cone with its apex at the outer element.

For a given diameter of the carrier 10, the inter-lens spacings in an arrangement employing four collector lenses as in FIG. 5 will obviously be less than when three lenses only are employed; an increase in inter-lens distance may be realized without departing from substantial equality of angular spacing of lens axes, by displacing certain ones of the lenses along the flight direction. For example, lenses 22 and 24 may be spaced either to the same side or to the opposite sides of the plane normal to the flight direction, as will be described with reference to FIG. 22. When the axes of the lenses lie in substantially the same plane, the mirror body 31 is realized as a right pyramid having four equal faces at equal angles with respect to flight direction 40. When the lenses are longitudinally displaced in addition, suitable provision is required to be made by adjusting the angle of each reflecting face, and in addition, the total length of mean ray paths must be made substantially constant. For example, faces of the pyramide body 31 may be disposed at different distances from the flight direction line so as to provide approximately constant length paths for all the reflected rays reaching the objective lenses 26, 27.

The images derived by the embodiment of FIG. 5 are shown in FIG. 7 assembled to lie in cubic packing pattern.

In the foregoing description, reference has been made to systems of various arrangements of lenses for common monitoring of a belt zone or of a hemisphere in space bounded on one side by a vertical longitudinal plane including the flight direction. It is to be understood that one or more further similar systems may be supported on a carrying vehicle to monitor contiguous and/or intersecting belt zones, or a complementary hemisphere in space.

A type of collector lens suitable for the embodiments hereinbefore described, shown in FIG. 8, comprises a negative lens assembly having 180 degree field of view. Elements 80 and 81 comprise a commercial wide angle lens assembly as supplied by Pacific Optical Corporation, Type 30006.

In one form of construction described in conjunction with FIGS. 2 and 3, an optical monitoring system is supported in a framework comprising pairs of circular bulkheads 60 and 61 having flanges 71, 72 respectively, spaced apart by three or more strips 62, 63, and 64, curved transversely to the radii of the flanges to which they are secured. Lenses 11, 12 and 13 are supported as by plastic or metal mountings 65, in apertures formed in the strips, to align their principal axes at predetermined angles with respect to plane faces of a mirror pyramid 30 disposed between the bulkheads. As may be observed by reference to FIG. 3, the adjustment of the mirror is accomplished by setting the spherically based concave platform 67 upon spherically ground seat 70 in bulkhead 60. A plurality of clamps 69 are then bolted down to permanently lock the platform in position. The mirror may be adjusted along a direction at right angles to the axes of the lenses and aligned with the flight direction by reciprocally sliding the shaft 73 on which the mirror is secured within a bore 68 centered in the platform, and clamping.

While in the foregoing there have been described systems wherein lenses having overlapped fields of view lie relatively near to each other, the embodiment of FIG. 9 illustrates a system wherein a single recording device 25 receives and simultaneously images fields viewed by widely spaced sets of wide angle negative lenses 11, 12, 13 and 11′, 12′, 13′, disposed in wing pods 10 and 10′. As will be readily apparent, lenses 12 and 11′ have overlapped fields of view, as do likewise lenses 13 and 13′ (not shown). In addition, when the lenses are spaced 120 degrees apart and lie with their axes in a common plane normal to the flight direction, significantly large sectors are monitored simultaneously by lenses 11—12′, lenses 11—13′, lenses 11′—12, and lenses 11′—13.

Each of the wing pods substantially corresponds to the structure 10 of FIG. 1, and includes a common mirror pyramid body 30. The optical bundles reflected from mirror 30 are further reflected by a single plane mirror 90 disposed at 45 degrees to the flight direction, down a periscope tube 75 extending within the wing of the aircraft, toward the objective lens comprising elements 26, 27, disposed at the remote end. The rays are focused by the objective system and are reflected by mirror 91 into camera 25, to produce discrete separated images on the film 29 lying in the focal plane of the composite lens. A corresponding mirror body 91′ serves a similar system of optical transfer and objective lens elements, serving a like system of lenses 11′, 12′ and 13′, mounted in wing pod 10′. Periscope tubes 75 and 75′ and camera 25 are provided with suitable blackened interior surfaces and are light tight.

Camera 25 is preferably realized as a 70 mm. high speed motion picture camera, with objective lens removed, for example the type known as "Multi-data Model V," produced by Flight Research Incorporated, Virginia, U.S.A. In locating the objectives 26, 27 and 26′, 27′, the distance between the film and the principal points of the objectives, and the distance between the latter points and the virtual image in the front element of the lens assembly is required to be proportioned in accordance jointly with the size of the lens aperture and the diameter of the desired size of image to be recorded. This places the objective well forward of the effective real image plane, and generally a distance of one-quarter of the total ray path length as measured from the front element of the lens assembly to the film surface.

The respective image elements may be assembled as shown in FIG. 12, within a parallelogram having a dimension "d" along the direction of advance of the film less than one standard frame. Such recording may be conveniently arranged by employing modified pull-down mechanism for less than full frame advance, and by employing a mask at the focal plane shaped in accordance with the outlines of the assembled elements. The distance "$d$" will be seen to be equal substantially to twice the diameter of the circular images. The latter are disposed so that the line of centers of each set of three aligned images forms an angle of 60 degrees with respect to the length of the film strip. It will also be directly apparent that for 70 mm. film stock, employing an image area whose width is 2.25 inches between perforations, the diameter of each sub-image is:

$$\frac{2.25}{2.7321}=0.825 \text{ inch}$$

In the embodiment of FIG. 10, a further lens element 43 is disposed in the pod 10 having its principal axis aligned with the flight direction and facing rearwardly. An additional reflecting plane mirror 110 is disposed adjacent mirror 90, to reflect the optical ray bundle along periscope tube 75 toward objective 26, 27, to record the image on film 29. In this embodiment it is to be understood that a similar and complementing structure (not shown) is provided in the wing pod carried on the other wing tip of the aircraft in the manner as in FIG. 9. The addition of a further element provides more complete coverage in the hemispheric plane lying aft of a vertical transverse plane through the periscope system. For this reason, each of the lenses 11, 12, 13 and 11', 12', 13' of the respective transverse belt groups may have their principal axes tipped forwardly with respect to their mirrors 30 and 30', to produce a correspondingly improved completeness of coverage in a hemispherical plane lying forwardly of a vertical plane passing through the periscope tube axis. The optical detail of a system of this type is shown in FIG. 11.

Figure 11:
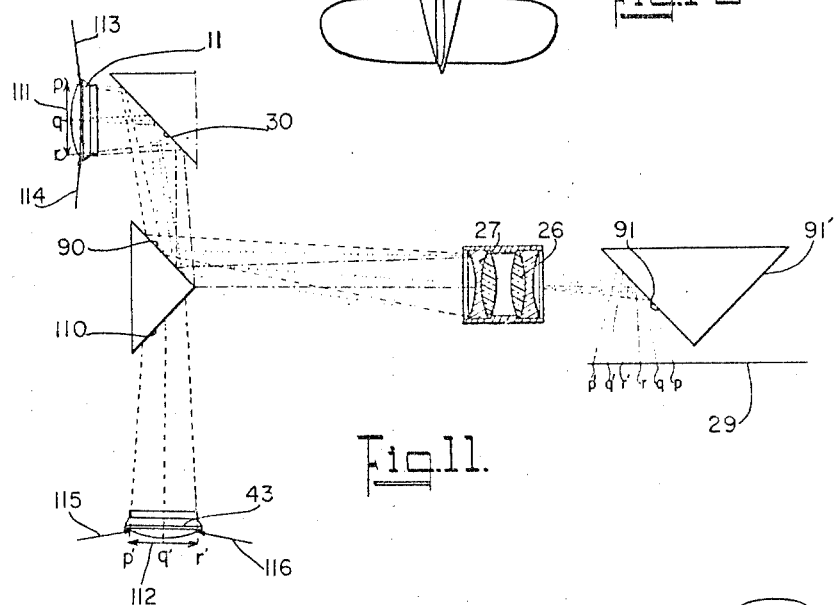
FIG. 11 shows in detail the optical periscope section on a transverse horizontal plane through the embodiment of FIG. 10.

In assembling the eight images for systems of FIGS. 10 and 11, a pattern as shown in FIG. 13 may be employed, wherein the frame size employed has a length equal to three image diameters and the lines of centers form angles of 60 degrees with respect to the length of the film strip. Packing of images may alternatively be provided to more fully utilize the area by masking off certain edges of sub-images to make possible recording other than circular areas of other adjacent images.

In locating the negative wide angle lens 112 in embodiments according to the diagram FIG. 11, where it is desired that the sizes of the real images $r$—$q$—$p$ and $r'$—$q'$—$p'$ on the film should be equal, the distance between virtual image 111 at lens 11 to the principal point of objective lens elements 26, 27, should be equal to the distance between the virtual image 112 at lens 43 and the principal point. Accordingly, the length of ray path for a mean ray such as that from point $q$ in virtual image 111 to its point of reflection from the face 90 of a common mirror should equal the length of the ray path from corresponding point $q'$ in virtual image 112 to the point of reflection from the mirror face 110. In addition, the location of images on the film plane 29 in a particular packing pattern requires that the apparent positions of all virtual images such as those marked 111 and 112 as viewed by the objective lens elements 26, 27, should be disposed in substantially the pattern desired, for example the pattern of FIG. 13.

For relatively short spacings between the virtual image and the objective lens the effective viewing angle of the combined lenses will be substantially that of the negative elements such as 11 and 43. As diagrammed, the field of view of such a collector lens generally comprises a cone whose apical angle is that lying between the marginal ray paths 113, 114, or 115, 116. The equivalent effective aperture and the equivalent focal length of a combination of a negative lens and a positive objective lens may be directly computed from the well known relationships for combinations of lenses:

$$f_0 = \frac{f_1 \times f_2}{f_1 + f_2 - e}$$

and $$D_0 = \frac{f_2 \times f_1}{F_2 \times S_2}$$

where $f_1$ is the focal length of the negative lens, and is a negative quantity when the virtual image lies forwardly of the lens; $f_2$ is the focal length of the objective lens; $e$ is the spacing between the negative and positive lenses; $f_0$ is the equivalent focal length of a combination; $F_2$ is the $f$-number of the objective lens, and $S_2$ is the distance between the virtual image of the negative lens and the center of the objective lens.

The larger the size of the virtual image, the greater may be the distance $S_2$ for a given size of real image at the film plane.

Optical monitoring arrangements comprising spaced groups of negative lenses associated with a recording camera 25 and optical systems according to the diagrams of FIG. 9 or 11, may be realized with various configurations of axes and spacings of the lenses. For example, according to an embodiment diagrammed with reference to FIGS. 14 and 15, two groups of collector lenses, namely a first group designated by their lens axes 14, 15 and 16, and a similar group of lenses designated by their axes 14', 15' and 16', are spaced apart, and arranged so that all lens axes radiate outwardly from common centers spaced apart in a support structure such as a vehicle. In the diagrams, the six-sided body having faces 94, 95, 96, and 104, 105, 106 respresent plane surfaces normal to respective lens axes, corresponding to viewing angles of substantially 180 degrees. Since the surfaces form an enclosed volume, it will be readily apparent that such a configuration of lenses is effective to monitor space externally to the enclosed volume, for monocular viewing. In addition, for any position of the body, there is always at least one pair of lenses visible to an observer in space not nearer to the body than a small multpile of the dimension of any one of the plane faces. It will also be apparent that since an observer will always see a pair of viewing lenses, the obverse is true, namely that at least one pair of viewing lenses will monitor any object in space surrounding the body and spaced from it by a distance not less than about three times the maximum dimension of any body face. Moreover, binocular viewing will substantially always be possible by a widely spaced pair of lenses, for example a pair whose axes are 14 and 15', in FIG. 15, or the pair whose axes are 16 and 14' in FIG. 14.

Whereas in the foregoing a system comprising six negative wide angle lenses arranged as two spaced apart groups of three has been described wherein the arrangement does not possess mirror symmetry about a bisecting plane normal to a line joining the common interesction points of axes of each groups of lenses, an organization having mirror symmetry is shown with reference to FIGS. 16 and 17. In the latter alternative, the set of lenses designated by their principal axes 34, 35 and 36 are spaced symmetrically from corresponding lenses designated by their axes 34', 35' and 36' with respect to an imaginary bisecting transverse plane normal to the line passed between the points of intersection of each of the groups of three lenses stated. Where such lenses have viewing angles of substantially 180 degrees, the six-sided bodies produced by the intersections of the fields of view of lenses 34, 35 and 36 designated 37, 38 and 39 respectively and fields of view of lenses 34', 35' and 36' designated 57, 58, 59 respectively, comprises two trigonal pyramids symmetrically opposed with respect to each other and having their bases registered. Accordingly, lenses whose axes are 34', 35' and 36' have associated therewith the bounding planes 57, 58 and 59, the three lines of intersections formed by planes 38 and 57, planes 37 and 58, and planes 39 and 59, lying in the mirror plane of symmetry. In such an embodiment, the volume of the space which is not viewed by any lens will be found to be less than in the embodiment of FIGS. 14 and 15, while binocular viewing by one lens of each group of three is assured for viewing an object in space in the vicinity of the lens system.

In the foregoing configurations, the rays from each of the optical elements may be focused on a common image plane according to the example of FIG. 9. Where the use of a periscope may not be feasible, an alternative optical system is described with reference to FIGS. 18 and 19, employing fiber bundles for the transmission of image elements produced by positive wide angle lenses.

In this embodiment, a group of wide angle positive objective lenses such as 76, 77, 78, 79, whose principal axes are directed outwardly for monitoring space about the wing pod 10 of an aircraft 99, are associated with image transmission bundles 52, 53, 54, 55, for conveying optical information to a common recording device 25 such as a camera. A corresponding system of wide angle objective lenses 76', 77', 78', 79', associated with respective fiber bundles 82, 83, 84, 85, are supported in a corresponding pod 10' at the other wing tip of the aircraft and the image information is likewise conveyed for simultaneous recording at the camera.

As will be more readily understood by referring to FIG. 19, a suitable wide angle positive objective lens 77 comprises forward element 33 and rear element 32 spaced apart by support structure 40, at one end of a tubular housing 88. A suitable lens for this purpose comprises that designated WRE1 "Ultra Wide-angle Lens" designed by the Commonwealth of Australia Weapons Research Establishment, having an effective field of view of substantially 180 degrees or better. The support 40 is suitably adhesively secured to the rear plane surface of forward element 33, and the rear element 32 is adjustable in position by rotation in the threaded insert 86 received in a bore coaxial with carrier 40. The combination is supported on a flange 92 integral with the forward end of tubular housing 88, on which it is secured by means of gasket 89 and threaded cap 87.

A bundle of parallely laid up optical glass fibers of small diameter, designated 56, have their end portions aligned substantially parallel with the lens axis within a telescopic slidable inner tubular support 93, and have their forward ends lying along a locus which may be planar or non-planar, at which the image forcused by the lens assembly 32, 33 appears. A positive image of the wide angle field of view is produced thereby, the individual fiber elements resolving the image into its elements and transmitting such image elements along their length, in a manner well known in the art. Each of the fiber bundles 52—55 and 82—85 are led in any suitable manner to terminate as an optical cable secured in suitable structure to present the ends of the fibers in an image pattern such as that of FIG. 13, facing the objective lens of the camera 25. Those skilled in the art will readily understand that the transmitted images are reproduced at the terminals of the individual fiber bundles, between whose receiving and transmitting ends correspondence of fiber patterns is maintained wherefrom identical images are simultaneously recordable on the film.

While generally the non-distortion of the image of a wide angle lens such as that of 77 is desired, the patterns of fiber bundles may be distorted suitably at the camera end, whereby to permit of more effectively packing the image information on a given film area, avoiding the marginal crowding of elements, and for various other purposes.

Figure 20:
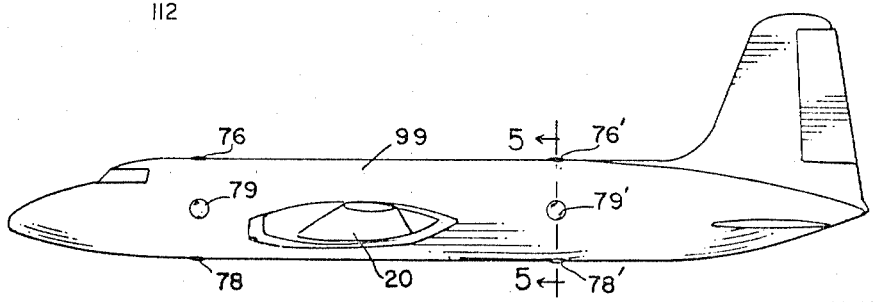
FIG. 20 is an elevation view of a further embodiment showing spaced belts of aircraft fuselage-supported collector lenses and remote viewing systems.

Various configurations of objective wide angle lenses may be employed with vehicles such as aircraft, the embodiment of FIG. 20 showing two belts of wide angle lenses according to the system of FIG. 19 associated with a transport aircraft. In this embodiment a forward belt comprises lenses 76, 77, 78 and 79 having their principal axes directed outwardly in a common plane transverse to the flight direction, which plane is spaced forwardly of the common plane including the axes of a similar belt comprising lenses 76', 77', 78' and 79'.

Referring to the diagram of FIG. 21, showing a cross-section of this optical system, each of the wide angle lenses is associated with a reflecting prism body 98 for producing images on planes which are parallel with the lens principal axis, the ends of the fibers being aligned at right angles to the lens axes and spaced to one side of the lens axis within the housing 97. Each of the fiber bundles commences in a respective housing 97, and extends continuously to a light-tight chamber 102 in one wall of which all of the bundles enter and terminate. The objective lens 107 of camera 25 is disposed in an opposite wall of the chamber to photograph the image produced on the common image plane 102 of the terminals of all the fibers in chamber 103. Such camera may suitably be supported in the aircraft where it will be out of the way of traffic, for example below a deck 101.

Camera 25 may comprise any type of recording or remote viewing device such as a television camera, and the information in the latter case may be transmitted by a local electrical cable circuit employing well known remote vision and display techniques, whereby the pilot and/or navigator may continuously monitor the space about the aircraft. It is also envisaged that the information may be transmitted alternatively or simultaneously as by a radio communications link to a ground station for the purpose of relieving aircraft personnel of monitoring duties.

Whereas in the foregoing a multiplicity of lenses has been described in arrangements for the purpose of monitoring space, in certain applications it may not be necessary to have a total spherical coverage, in which case a system comprising four wide angle lenses each having a field of view of substantially 160 degrees, may be employed, as described with reference to FIGS. 22, 23 and 24. In this embodiment, a system of lenses 21, 22, 23, and 24, carried on a wing pod 10 supported on the tip of wing 20 are located as pairs diametrically opposite each other, the axes of lenses of each pair lying in a common plane but not being parallel. As will be seen best in FIG. 22, the axis 45 and the axis 47 of respective lenses 22 and 24 are directed rearwardly outwardly, making an angle of approximately 35 degrees with respect to a transverse diameter passing through the mirror body 31. The axes of lenses 21 and 23 are similarly directed outwardly and angularly displaced a corresponding amount forwardly of the transverse diameter. Each of the lenses is supported to protrude slightly from the surface of faired pod 10, and may be carried on form-faired protrusions such as 108 and 109. Alternatively, the lenses may be recessed as in formed recesses 119 associated with lens 23.

The faces of mirror body 31 are suitably disposed with respect to the axis of camera 25 and each of the lens axes 44, 45, 46 and 47, whereby to produce a desired pattern of images on a film plane, and to ensure that the distance between the virtual image of each of the negative collector lenses 21 to 24 and the objective lens of the camera remains substantially constant, as measured along the mean ray path.

The monocular and binocular monitoring achieved by such a configuration of wide angle lenses may be understood by reference to FIG. 24, wherein the conic surfaces 121, 122, 123, and 124 represent the margins of the fields of view of lenses whose respective axes are designated 44, 45, 46, and 47. It will be apparent that monocular viewing of an object in space anywhere about the lens group is possible. It will also be apparent that the association of such a configuration of lenses with a group complementary thereto and spaced therefrom employing common image assembly means such as that of FIG. 9, assures substantially complete binocular monitoring of space. Moreover, each system independently provides to a substantial degree binocular monitoring of space about a support structure such as pod 10 as may be appreciated by inspection of the surfaces of the non-viewed volume enclosed by the intersecting cones of view.

I claim:

1. The combination of: an image recording device having a strip recording medium disposed in a focal plane, a pair of spaced apart objective lenses, a pair of adjacent plane mirrors, said mirrors respectively lying between an associated objective lens and said strip medium and having their reflecting planes obliquely intersecting the optical axes of said associated lenses to reflect respective near-axial optical ray bundles focused upon adjacent areas of said medium, a pair of intermediate single mirrors each spaced from an associated objective lens on the side remote from said adjacent pair of mirrors, and obliquely intersecting the optical axis of said lens, a pair of reflector bodies each comprising a plurality of contiguous plane mirror faces disposed about and obliquely intersecting a common axis of said body, and each body being spaced laterally from an associated single mirror with said common axis intersecting said mirror, and like pluralities of wide angle negative lenses so spaced about and disposed with respect to respective associated reflector bodies so that near-axial optical ray bundles from said negative lenses are incident upon respective reflecting plane faces in said bodies and are reflected therefrom into an intermediate single mirror and therefrom to an associated objective lens for producing from the virtual image of each negative lens a real image record.

2. The combination of claim 1 wherein said negative lenses have their optical axes angularly spaced about said common axis and the fields of view of adjacent lenses overlapped, and predetermined lenses of respective pluralities have their fields of view overlapped.

3. The combination claimed in claim 2 wherein each plurality of negative lenses comprises three lenses having their optical axes diverging in a common plane with an angular spacing between adjacent axes of substantially 120 degrees and the field of view of each lens is about 180 degrees, and the said common axis of one reflector body is parallel with the common axis of the other reflector body.

4. The combination of claim 3 wherein the optical axes of said objective lenses are aligned and said intermediate single mirrors, said objective lenses, and said adjacent pair of mirrors are disposed in line within an extended tubular housing, said housing having side apertures adjacent its ends to pass near-axial optical ray bundles reflected from respective reflector bodies to said single mirrors and a side aperture intermediate the ends to pass near-axial optical ray bundles reflected from adjacent plane mirror.

5. The combination of claim 2 wherein said images are recorded as equal contiguous circular areas having their lines of centers disposed at angles of 60 degrees, one of said lines of centers being along the length of said strip.

6. The combination of claim 2 wherein said tubular housing supports an additional mirror adjacent each intermediate single mirror, said additional mirror having its plane reflecting surface obliquely intersecting the plane of said objective lens optical axis and is angularly disposed thereto oppositely to the angle made with said axis by the intermediate single mirror, and said housing is apertured adjacent its ends on the side opposite the aperture facing a reflector body, a further negative lens is supported for incidence of a near-axial optical ray bundle from said further lens on said additional mirror for reflection to an objective lens, the field of view of said additional lens being about 180 degrees.

References Cited in the file of this patent

UNITED STATES PATENTS

| | | |
|---|---|---|
| 705,771 | Lumiere | July 29, 1902 |
| 849,570 | Pino | Apr. 9, 1907 |
| 1,085,611 | Humbrecht | Feb. 3, 1914 |
| 1,626,787 | Corlett | May 3, 1927 |
| 1,708,746 | Von Hofe | Apr. 9, 1929 |
| 1,797,849 | Aschenbrenner | Mar. 24, 1931 |
| 1,964,968 | Warmisham | July 3, 1934 |
| 2,283,788 | Briechle et al. | May 19, 1942 |
| 2,304,434 | Ayres | Dec. 8, 1942 |
| 2,362,887 | Corte | Nov. 14, 1944 |
| 2,639,653 | Fischer | May 26, 1953 |
| 2,685,230 | Baker | Aug. 3, 1954 |
| 2,940,356 | Volkmann | June 14, 1960 |

FOREIGN PATENTS

| | | |
|---|---|---|
| 405,612 | Great Britain | Jan. 26, 1934 |
| 620,538 | Germany | Oct. 23, 1935 |
| 66,590 | Netherlands | Oct. 16, 1950 |
| 771,243 | Great Britain | Mar. 27, 1957 |